(12) United States Patent
Chang et al.

(10) Patent No.: US 6,385,011 B1
(45) Date of Patent: May 7, 2002

(54) AIR BEARING SLIDER AND MANUFACTURING METHOD THEREFOR

(75) Inventors: Yu-En Percy Chang, Mountain View, CA (US); Jack Dana Cook, Washington, UT (US); Cherngye Hwang, San Jose; Sanford J. Lewis, Palo Alto, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/303,011

(22) Filed: Apr. 30, 1999

(51) Int. Cl.$^7$ ................................................ G11B 17/32
(52) U.S. Cl. .................................................. 360/234.3
(58) Field of Search ........................... 360/234.3, 235.1, 360/235.2, 235.3, 235.4, 235.8, 234.6

(56) References Cited

U.S. PATENT DOCUMENTS

| | | | |
|---|---|---|---|
| 5,021,906 A | | 6/1991 | Chang et al. |
| 5,345,353 A | * | 9/1994 | Krantz et al. |
| 5,982,583 A | * | 11/1999 | Strom ...................... 360/234.3 |
| 6,073,337 A | * | 6/2000 | Strom ...................... 29/603.12 |
| 6,288,873 B1 | * | 9/2001 | Lundquist et al. ........ 360/234.6 |
| 6,312,313 B1 | * | 11/2001 | Gee et al. ................... 360/122 |

FOREIGN PATENT DOCUMENTS

| | | |
|---|---|---|
| JP | 89-030082 | 1/1989 |
| JP | 0088975 | 4/1989 |

OTHER PUBLICATIONS

IBM Technical Disclosure Bulletin, vol. 30, No. 8 Jan. 1988 entitled: Flexible Magnetic Head Slider.

* cited by examiner

*Primary Examiner*—Allen Cao
(74) *Attorney, Agent, or Firm*—Robert O. Guillot; Oppenheimer Wolff & Donnelly LLP (57) ABSTRACT

An air bearing slider embodiment of the present invention includes a body portion having an air bearing surface (ABS) side and a flexure surface side. The ABS side has at least one air bearing surface and at least one recessed area. A thin film composed of a compressive force material is deposited within the recessed area. The compressive force material produces an omnidirectional outward force within the recessed area that creates a positive crown and camber. Preferably, the thin film has a thickness range from 10 nm to 200 nm, and is composed of diamond-like carbon (DLC). An alternative air bearing slider includes a body portion with an ABS side and a flexure surface side. A thin film composed of a tensile force material is deposited upon said flexure side. The tensile force material creates an onmidirectional inward force on the flexure side which results in positive crown and camber. The manufacturing method for the improved sliders utilizes semiconductor processing techniques. The basic slider body is appropriately masked and etched to create the air bearing surfaces, air pressure surfaces and recessed area of the ABS side. Thereafter, the compressive material thin film is deposited within the recessed area. An improved manufacturing method utilizes the preexisting photomask of a prior art slider design, such that additional photomasking steps are not required to achieve the deposition of the compressive material thin film. Manufacturing of the tensile force material embodiment requires the step of depositing the film upon the flexure side.

18 Claims, 6 Drawing Sheets

AIR BEARING SLIDER AND MANUFACTURING METHOD THEREFOR

BACKGROUND OF THE INVENTION

1. Field of the Invention

The present invention relates generally to air bearing sliders and more particularly to the establishment of a positive crown and camber on the slider utilizing deposited thin films.

2. Description of the Prior Art

Air bearing sliders are generally used as mounting platforms for read/write heads for hard disk drives. To optimize the read/write head performance it is necessary to carefully control the height of the read/write head, and to do so, it is necessary to control the height at which the slider flies above the hard disk surface. Generally, the closer that the read/write head flies to the surface of the hard disk, the better performance characteristics are obtained.

Typically, the read/write head is disposed at the rearward edge of the slider, and the optimal slider flying orientation is such that the rearward edge flies closest to the disk surface, whereas the leading edge of the slider flies higher off of the disk surface. Improved slider flying characteristics have been obtained in the prior art by providing a positive crown and camber to the air bearing surface (ABS) side of the slider. Positive crown refers to a generally convex arc of the ABS side from the leading edge to the trailing edge, while positive camber refers to a generally convex arc from the left edge to the right edge of the ABS side.

Various devices and methods have been developed in the prior art to achieve positive crown and camber. Such methods include the physical shaping of the surfaces, such as by lapping, as well as devices that are designed to provide adjustable crown and camber. Such adjustable devices include piezoelectric elements in the slider structure which respond to electrical current from a control system to physically alter the shape of the slider to achieve positive crown and camber. Such a device is described in U.S. Pat. No. 5,021,906, issued Jun. 4, 1991 to Chang, et al.

Another prior art method for achieving positive crown and camber involves the use of a backing material having a higher thermal expansion coefficient than that of the slider body material. The backing material is deposited by high temperature sputtering on the flexure side of the slider. When the temperature of the processed slider returns to room temperature, the difference in the thermal expansion coefficients between the backing material layer and the slider body material causes a positive crown and camber to occur. This slider manufacturing method is described in Japanese Patent No. 1,030,082, entitled: Manufacture of Magnetic Head Slider, issued Jan. 31, 1989 to Daito et al.

A simplified method for achieving positive crown and camber is desirable in the industry. For many applications it is sufficient to utilize a slider that is permanently formed with a positive crown and camber, as opposed to the complexity of a slider having an adjustable crown and camber, which requires additional control systems. Additionally, where slider materials are temperature sensitive, the utilization of high temperature sputtering to take advantage of differing thermal expansion coefficients is not desirable. A need therefore exists for a simple and effective method for achieving positive slider crown and camber. The present invention seeks to fill that need by utilizing thin films having compressive force or tensile force properties that achieve positive crown and camber when deposited upon the appropriate surfaces of the slider.

SUMMARY OF THE INVENTION

An air bearing slider embodiment of the present invention includes a body portion having an air bearing surface (ABS) side and a flexure surface side. The ABS side has at least one air bearing surface and at least one recessed area. A thin film composed of a compressive force material is deposited within the recessed area. The compressive force material produces an omnidirectional outward force within the recessed area that creates a positive crown and camber. Preferably, the thin film has a thickness range from 10 nm to 200 nm, and is composed of diamond-like carbon (DLC). An alternative air bearing slider includes a body portion with an ABS side and a flexure surface side. A thin film composed of a tensile force material is deposited upon said flexure side. The tensile force material creates an onmidirectional inward force on the flexure side which results in positive crown and camber. The manufacturing method for the improved sliders utilizes semiconductor processing techniques. The basic slider body is appropriately masked and etched to create the air bearing surfaces, air pressure surfaces and recessed area of the ABS side. Thereafter, the compressive material thin film is deposited within the recessed area. An improved manufacturing method utilizes the preexisting photomask of a prior art slider design, such that additional photomasking steps are not required to achieve the deposition of the compressive material thin film. Manufacturing of the tensile force material embodiment requires the step of depositing the film upon the flexure side.

It is an advantage of the present invention that a slider having improved positive crown and camber is produced.

It is another advantage of the present invention that a slider having improved positive crown and camber is produced utilizing existing manufacturing steps with the addition of a thin film deposition step.

It is a further advantage of the present invention that an improved slider is produced with minimal increased cost and complexity to the slider manufacturing process.

These and other features and advantages of the present invention will become well understood by those skilled in the art upon reviewing the following detailed description which makes reference to the several figures of the drawing.

DETAILED DESCRIPTION OF THE PREFERRED EMBODIMENTS

Positive crown and positive camber are desirable qualities for air bearing sliders because they allow the read/write head to fly closer to the surface of the disk. The present invention achieves positive crown and camber through the deposition of selected thin films upon one or more appropriate surfaces of the slider. The thin films are applied utilizing process conditions that create compressive or tensile forces within the thin films. In particular, a thin film designed to create compressive forces may be deposited on the air bearing surface side (ABS side) of the slider, while a thin film designed to create tensile forces is deposited on the flexure side of the slider. These thin film forces act to create the positive crown and/or camber that is desired.

Figure 1:
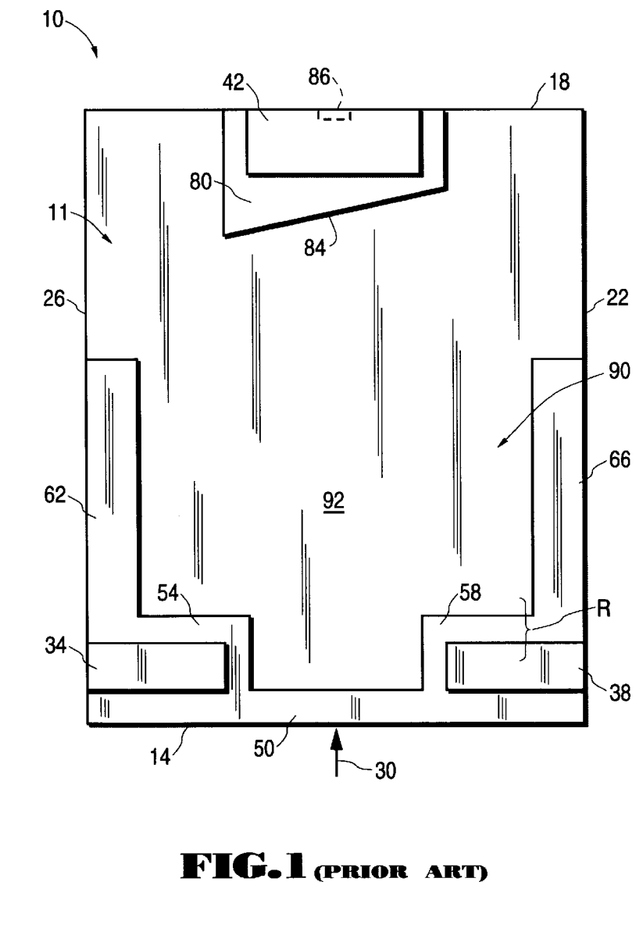
FIG. 1 is a plan view of the air bearing surface (ABS) side of a prior art slider.
Figure 2:
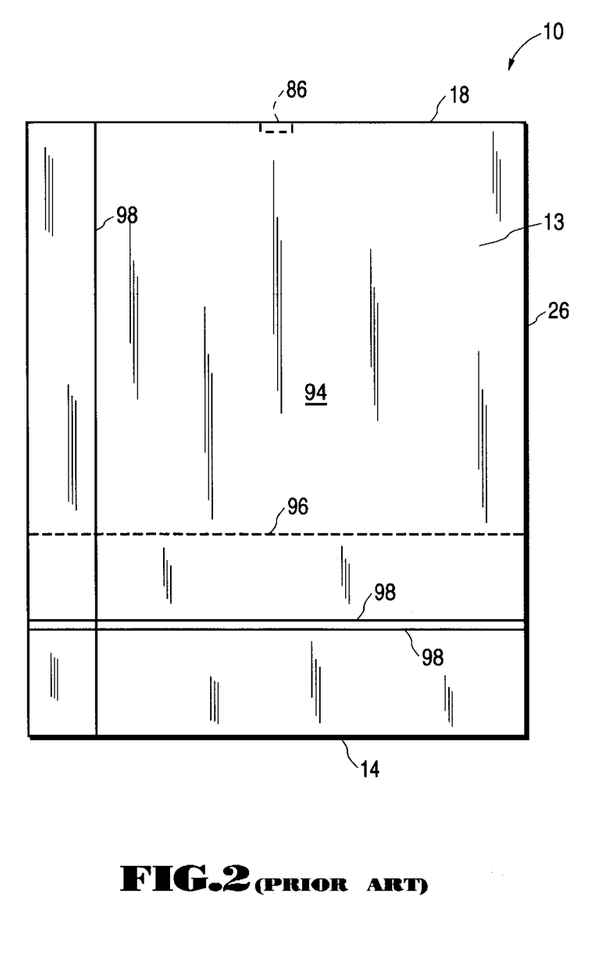
FIG. 2 is a plan view of the flexure side of the prior art slider.

To aid in the understanding of the invention an example of a prior art air bearing slider 10 is depicted in FIGS. 1 and 2, wherein FIG. 1 is a plan view, depicting the air bearing surface (ABS) side 11, and FIG. 2 is a top plan view depicting the flexure side 13 of the slider. It is to be understood that the prior art slider depicted in FIGS. 1 and 2 is presented by way of example only, and the present invention is generally applicable to air bearing sliders of varied configurations. As depicted in FIGS. 1 and 2, the prior art air bearing slider 10 includes a solid material body 12, a front edge 14, a rear edge 18, a right side edge 22 and a left side edge 26. The slider 10 flies above a disk such that the surface of the disk (not shown) moves past the slider in the direction represented by arrow 30. The slider 10 includes a left air bearing surface 34, a right air bearing surface 38 and a rear air bearing surface 42. A front air pressure surface 50 is recessed into the body 12 of the slider 10 relative to the air bearing surfaces 34 and 38. A leftward portion 54 of the air pressure surface 50 forms an expanded platform for the left air bearing surface 34, and a rightward portion 58 of the air pressure surface 50 forms an expanded platform for the right air bearing surface 38. The left portion 54 of the air pressure surface 50 further includes a left side leg portion 62, and the right side portion 58 of the air pressure surface 50 includes a right side leg portion 66. The left side portion 62 and right side portion 66 provide a stabilizing effect to the flying characteristics of the slider 10. A rearward air pressure surface 80 provides an expanded platform for the rearward air bearing surface 42, and a leading edge 84 of the air pressure surface 80 may be skewed to affect the flying characteristics of the slider 10 A read/write head 86 is disposed at the rearward edge 18. A recessed central portion 90 defined by recessed surface 92 is formed into the body 12 of the slider 10 to provide appropriate flying characteristics to the slider 10. The depth R of the recessed area 90 relative to the air bearing surfaces 34, 38 and 42 is significant in determining the flying characteristics. As depicted in FIG. 2, the upper surface 94 of the slider 10 is flat and smooth. However, it is known in the prior art to utilize a laser or other appropriate devices to make many pits 96 or cuts 98 into the surface 94 in order to disrupt compressive surface forces, with the effect of creating an imbalance between compressive surface forces at the surface 92 within the recess 90 as opposed to compressive surface forces of the upper surface 94. When the compressive forces of the surface 92 are greater than the compressive forces of the surface 94, a positive crown and positive camber will be created.

Figure 3:
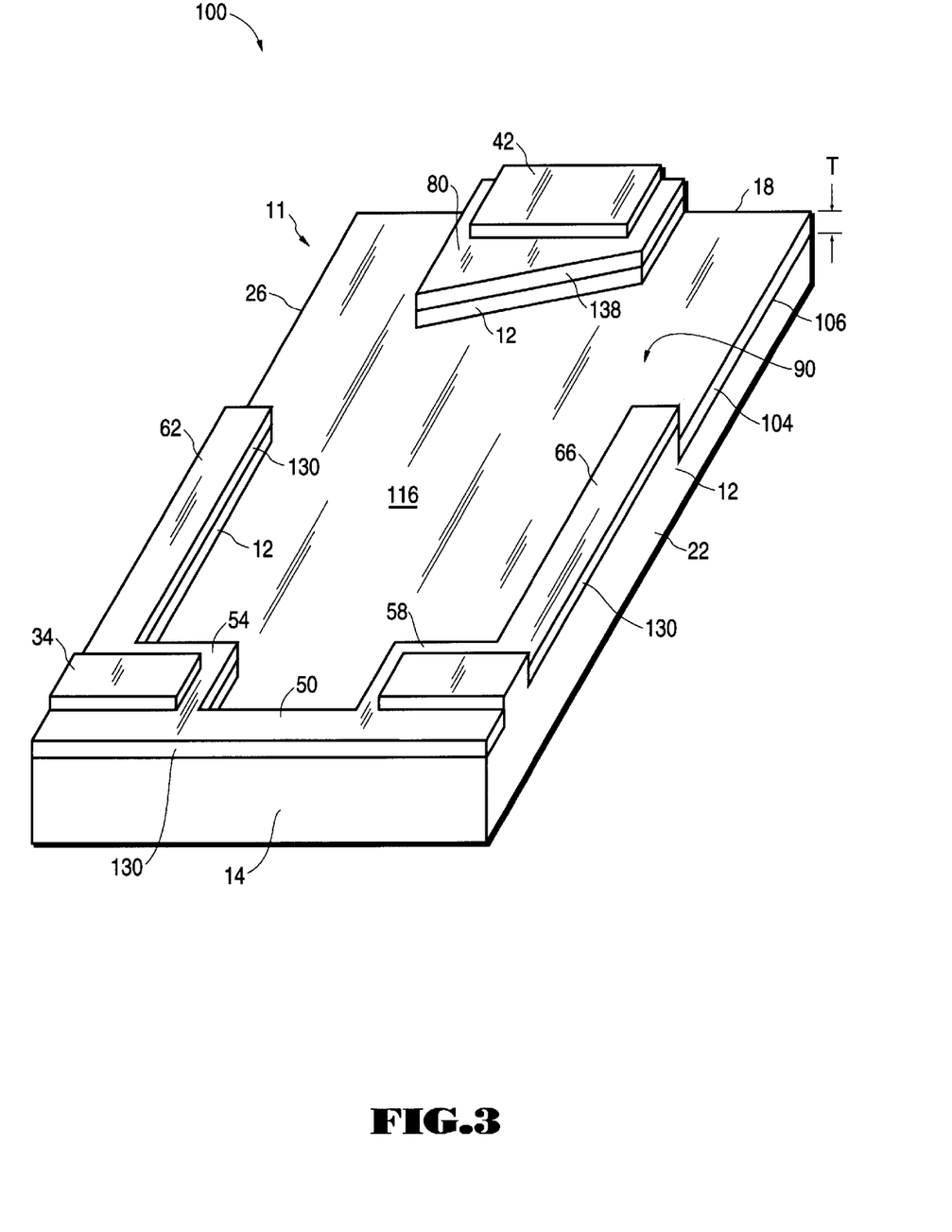
FIG. 3 is a perspective view of a first preferred embodiment of an air bearing slider of the present invention, wherein the thickness dimensions are greatly expanded for ease of depiction and comprehension.
Figure 4:
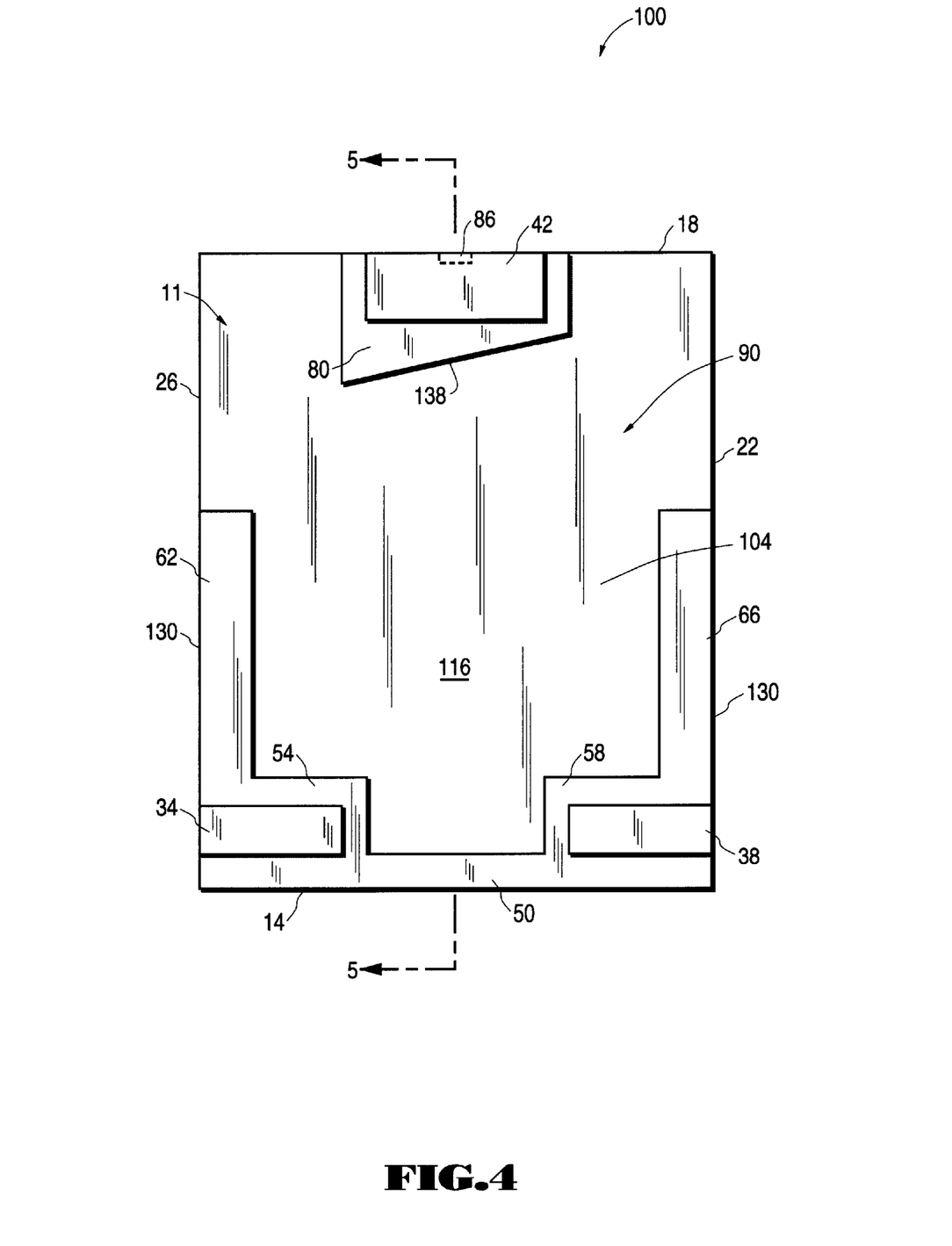
FIG. 4 is a plan view of the slider depicted in FIG. 3.
Figure 5:
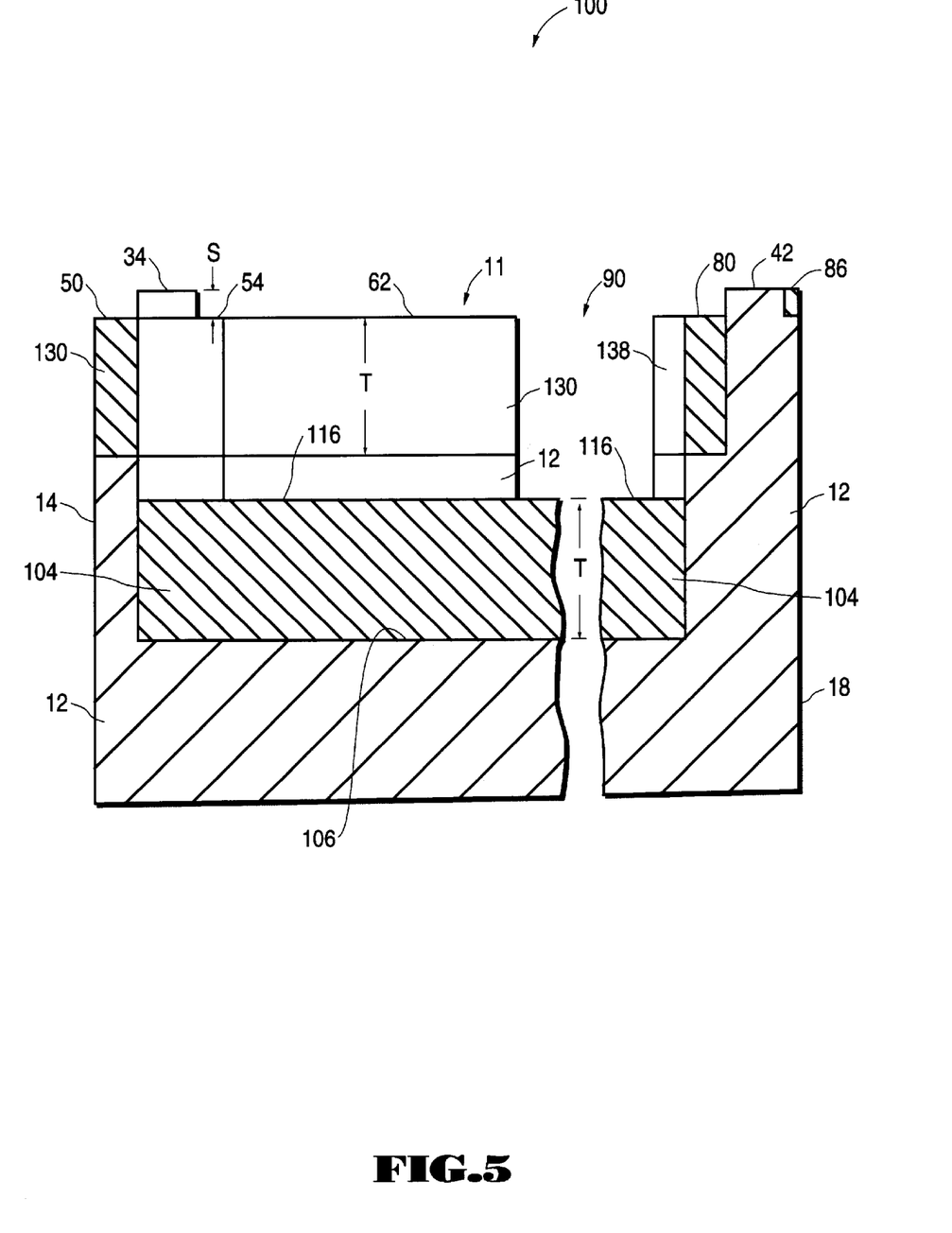
FIG. 5 is a side cross-sectional view of the slider depicted in FIG. 4, taken along lines 5—5 of FIG. 4, and wherein the thickness dimension is greatly exaggerated for ease of depiction and comprehension.

A first preferred embodiment 100 of the present invention is depicted in FIGS. 3–5 wherein FIG. 3 is a perspective view of the air bearing side 11 of the improved slider 100, FIG. 4 is a plan view of the air bearing side 11 of the slider 100, and FIG. 5 is a side cross-sectional view taken along lines 5—5 of FIG. 4, and wherein the thickness dimensions of the slider 100 are greatly magnified for the purpose of depiction and comprehension. To facilitate comprehension of the invention, similar structures of the prior art device 10 and the present invention 100 are identically numbered. Therefore, the slider 100 includes a body of material 12 having a front edge 14, a rear edge 18, a right side edge 22 and a left side edge 26. Air bearing surfaces 34 and 38 project outwardly relative to the air pressure surface 50, which includes left side surface portions 54 and 62 and right side surface portions 58 and 66. A rear air bearing surface 42 projects outwardly relative to a rear air pressure surface 80, and a recessed area 90 is centrally disposed within the body 12 of the slider 100.

The significant feature of the slider 100 is a thin film 104 that is formed upon the surface of the recessed area 90. The thin film layer 104 is formed with a substance and utilizing a deposition process that creates a strong omnidirectional compressive force within the film 104. Such a compressive force seeks to push outwardly in all directions on a molecular level, as is known in the art. Thus it is to be understood that the layer 104 is bonded during a deposition process to the interior surface 106 of the recessed area 90, and that the compressive force within the layer 104 acts to create positive crown and camber to the air bearing side 11 of the slider 100. A preferred composition for the layer 104 is Diamond Like Carbon (DLC) having a thickness T of from 10 nm to 200 nm. Generally, a thicker layer 104 will apply a greater compressive force, yielding a more positive crown and camber.

As is known to those skilled in the art, the depth of the recessed surface 90 relative to the air pressure surfaces 50 and 80 significantly affects the flying characteristics of the slider 100. Therefore, as will be described in greater detail hereinafter, initially the depth of the recess 90 is formed into the body 12 to an extra depth, such that the resulting outer surface 116 of the thin film layer 104 within the recessed area 90 achieves the appropriate depth relative to the air pressure surfaces 50 to maintain appropriate flying characteristics.

It is therefore to be understood that a basic embodiment of the present invention includes a compressive layer 104 formed within the central recessed area 90 of a slider. This generalized embodiment of the present invention is intended by the inventors to apply to all types and configurations of air bearing sliders, regardless of the number and location of the air bearing surfaces and air pressure surfaces that may be formed on the air bearing side of the slider.

For reasons of simplicity in manufacturing and to achieve somewhat better performance characteristics, the first preferred embodiment 100 also includes a layer of the compressive material that is disposed to form the forward air pressure surface 50 and rearward air pressure surface 80. Thus, a compressive material layer 130 is disposed upon the appropriate portions of the slider body 12 to form the forward air pressure surface 50, and a compressive material layer 138 is formed upon the rearward portions of the slider body 12 to form the rearward air pressure surface 80. The deposition of the layers 130 and 138 is accomplished during the same deposition step in which the layer 104 is applied. Significantly, no additional masks are necessary during the manufacturing of the slider 100 over those used to manufacture the prior art flyer 10, because the same mask that was used in the prior art to create the air pressure surfaces 50 and 80 may be subsequently utilized during the thin film layer deposition step, as is discussed more fully herebelow.

Figure 6:
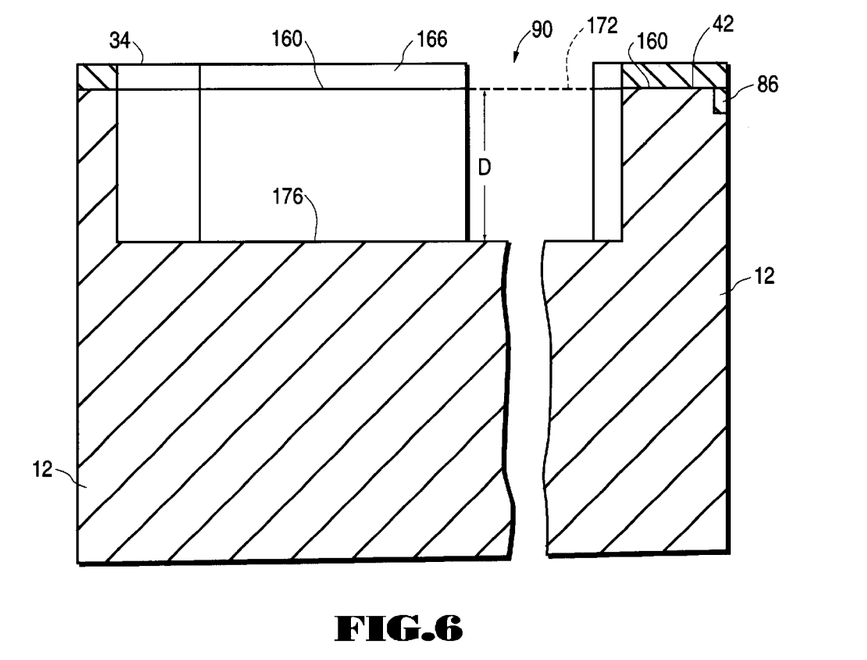
FIG. 6 is a cross-sectional view depicting a step in the manufacturing process of the slider depicted in FIGS. 3–5.
Figure 7:
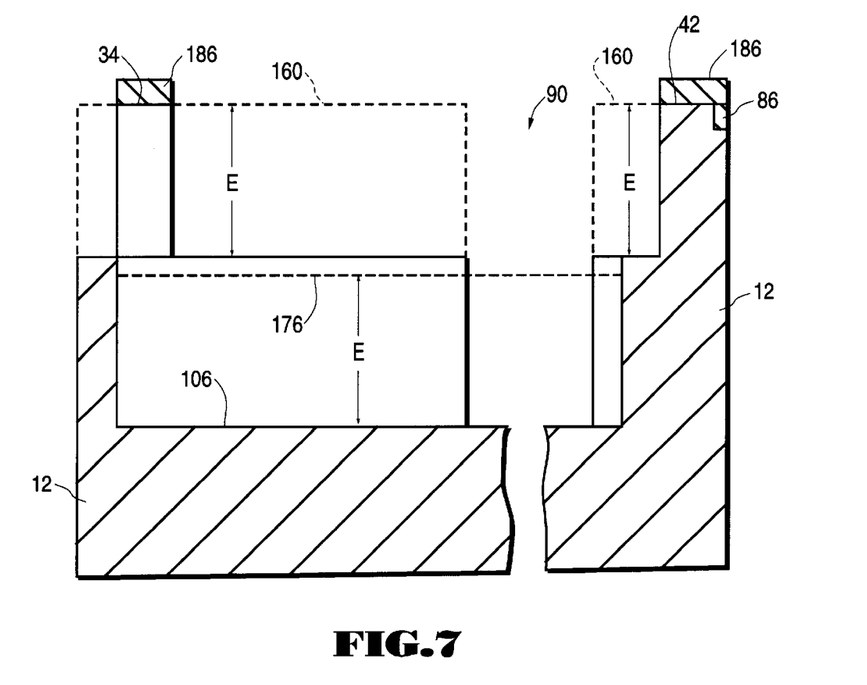
FIG. 7 is a cross-sectional view depicting a further step in the manufacturing of the slider depicted in FIGS. 3–5.

The manufacturing steps to create the slider 100 are depicted in FIGS. 6 and 7, when taken in conjunction with the completed slider depicted in FIG. 5 and discussed hereabove. Initially, as depicted in FIG. 6, the slider body 12 comprises a solid block of material wherein the upper surface 160 has been polished, such as by lapping, to produce a surface suitable to act as the air bearing surfaces 38, 34 and 42 of the completed slider 100. Utilizing techniques common in the semiconductor processing industry, a photoresist mask 166 is applied to those areas of the slider surface which will become the air bearing surfaces 34, 38 and 42 and the air pressure surfaces 50 (including leg portions 62 and 66) and rear air pressure surface 80. Thus, the slider body surface portion that forms the recessed area 90 is exposed for etching (172 shown in phantom). Thereafter, the exposed central portion 172 of the slider body 12 is etched a predetermined depth D (the value of which is discussed herebelow) to form the surface 176. A preferred etching technique is ion milling. Following the first etching step the photoresist mask 166 is removed.

As depicted in FIG. 7 a second photoresist mask 186 is then applied to the upper surfaces 160 of the slider body 12; however, the mask 186 covers only the air bearing surfaces 34, 38 and 42, and the remaining surfaces 160 (shown in phantom) are exposed for etching. The surface 176 (shown in phantom) within the recessed area 90 is also exposed for further etching. Thereafter, an etching step is conducted, such as ion milling, wherein the exposed surfaces are etched to a predetermined depth E (the value of which is discussed herebelow), such that the surface 106 within the recessed area 90 is formed.

The photoresist mask 186 is then maintained in position for the thin film deposition step. With additional reference to FIG. 5, a thin film deposition step is next performed in which the thin film is deposited to form the centrally disposed compressive layer 104 and the layers 130 and 138 which form the air pressure surfaces 50 and 80, as discussed hereabove. The thin film layer 104 is deposited to a predetermined thickness T that is designed to generate suitable compressive forces that will achieve the desired positive crown and camber described herein. The same layer thickness T forms the air pressure surfaces 50 and 80 and it is to be noted (as depicted in FIG. 5), that the air bearing surfaces 38 and 42 project a distance S above the air pressure surfaces. It is therefore to be understood that E=T+S, where T is the predetermined thin layer compressive material thickness and S is the standard, prior art projection of the air bearing surface over the air pressure surface. It is also to be understood that D is determined by starting with the prior art value R for the depth of the recessed area 90, as measured from the air bearing surface (34, 38, 42) level. Thus, R=D+E−T, which yields D=R−S. Therefore, the recess 90 of the ABS side 11 of the slider 100 can be etched to a sufficient depth to receive a thin film compressive layer 104, in such a manner as to retain the desired, prior art, dimensional relationships of the air bearing surfaces, the air pressure surfaces and the recess depth of the slider.

A slider performance benefit is obtained by applying the DLC layer 130 and 138 to the air pressure surfaces over the prior art, in that the prior art air pressure surfaces are formed from the slider body material 12, typically TiAlC, whereas the air pressure surfaces of the slider 100 are composed of the DLC deposited layer material. In addition to better flying characteristics due to positive crown and camber, the slider 100 is preferable to the prior art slider 10 because the DLC surfaces are less affected by disk oil than the TiAlC surfaces of the prior art.

Figure 8:
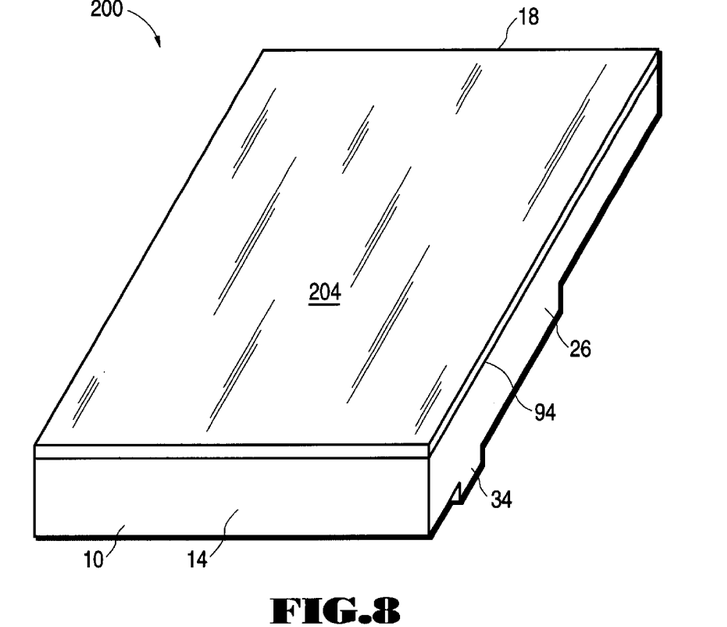
FIG. 8 is a perspective view of an alternative preferred embodiment of the air bearing slider of the present invention.

FIG. 8 is a perspective view of an alternative slider embodiment 200 of the present invention, which basically comprises the prior art slider 10 having a thin film layer 204 deposited thereon. As depicted in FIG. 8, the prior art slider 10 is positioned with its ABS side 11 down and its flexure side 13 up. The significant difference between the present invention 200 and the prior art slider 10 is that a thin film layer 204 has been deposited upon the upper surface 94 of the prior art slider 10. The thin film layer 204 is formed utilizing a material and deposition process parameters that creates a tensile force material layer 204 on the surface. As is known to those skilled in the art, the tensile layer 204 creates a strong omnidirectional tensile force which seeks to pull inwardly in all directions on a molecular level. Thus the layer 204 acts to create a positive crown and camber to the air bearing side 112 of the slider 200. While there are many suitable tensile materials and deposition parameters known to those skilled in the art, the preferred tensile layer material is Tantalum. The depth range of the Tantalum film is from 50 nm to 1000 nm, to achieve acceptable results.

Figure 9:
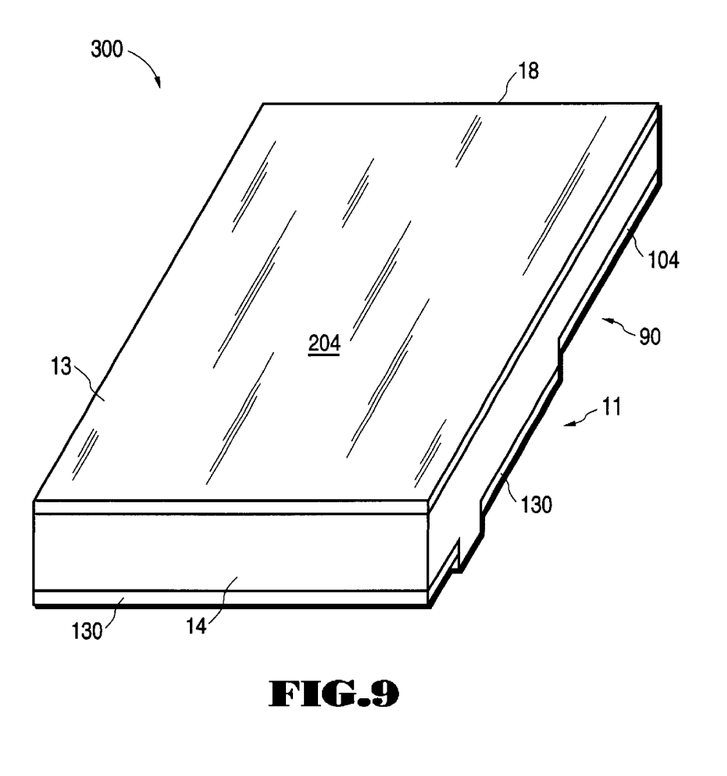
FIG. 9 is a perspective view of another alternative preferred embodiment of the air bearing slider of the present invention.

FIG. 9 is a perspective view depicting a further preferred slider embodiment 300 of the present invention. The slider 300 comprises a combination of the features of slider embodiments 100 and 200 described hereinabove. That is, slider 300 includes the compressive thin film layer 104 disposed within the recess 90 on its ABS side 11, and the tensile material thin film layer 204 disposed on its flexure side 13. Thus, the combination of the two thin film layers additively increases the positive crown and camber that is individually created by each layer. Additionally, as would be obvious to those skilled in the art, the upper surface of the flexure side of the slider 200 can be laser treated, as described hereinabove, to further increase the positive crown and camber of the slider.

While the invention has been shown and described with reference to certain preferred embodiments, it is to be understood that certain alterations and modifications in form and detail will become obvious to those skilled in the art upon reading the preceding disclosure. It is therefore intended by the inventors that the following claims cover all such alterations and modifications nevertheless include the true spirit and scope of the invention.

We claim:

1. An air bearing slider, comprising:
   a body portion having an air bearing surface side and a flexure surface side;
   at least one air bearing surface being formed on said air bearing surface side;
   at least one recessed area being formed on said air bearing surface side;
   a compressive material thin film, that creates a compressive force within said thin film, being deposited within said recessed area, whereby said slider is formed with a positive crown.

2. A slider as described in claim 1 wherein said thin film is disposed throughout said recessed area.

3. A slider as described in claim 1 wherein said air bearing surface side also includes air pressure surfaces, and wherein said air pressure surfaces are formed from said thin film.

4. A slider as described in claim 1 wherein said thin film is composed of diamond-like carbon.

5. A slider as described in claim 4 wherein said thin film has a thickness ranges from 10 nm to 200 nm.

6. A slider as described in claim 1 wherein a second thin film is disposed on said flexure surface, said second thin film being a tensile material thin film, that creates a tensile force within said second thin film.

7. A slider as described in claim 6 wherein said flexure surface is laser treated prior to the deposition of said second thin film thereon.

8. A slider as described in claim 6 wherein said second thin film is comprised of Tantalun.

9. A slider as described in claim 8 wherein said second thin film is formed with a thickness range from 50 nm to 1000 nm.

10. A slider as described in claim 1 wherein said flexure surface is laser treated to achieve positive crown.

11. An air bearing slider, comprising:
- a body portion, said body portion having an air bearing surface side and a flexure surface side;
- a tensile material thin film, that creates a tensile force within said thin film, being deposited upon said flexure surface, whereby said slider is formed with a positive crown.

12. A slider as described in claim 11 wherein said flexure surface is laser treated prior to the deposition of said thin film thereon.

13. A slider as described in claim 11 wherein said thin film is composed of Tantalum.

14. A slider as described in claim 13 wherein said thin film has a thickness range from 50 nm to 1000 nm.

15. A method for manufacturing an improved air bearing slider comprising the steps of:
- etching a surface of a slider material body to form an air bearing surface side including at least one air bearing surface and at least one recessed area;
- depositing a compressive material thin film, that creates a compressive force within said thin film, within said recessed area, whereby said slider is formed with a positive crown.

16. A method as described in claim 15 including the further steps of forming said recessed area with an increased depth, and depositing said compressive material film within said recessed area to fill said increased depth.

17. A method as described in claim 15 including the further step of depositing a second thin film upon a flexure surface side of said body, said second thin film being a tensile material thin film that creates a tensile force within said second thin film.

18. A method as described in claim 17 including the further step of performing a laser crown adjustment step to said flexure surface side of said material body.

* * * * *